United States Patent [19]
Mercuri et al.

[11] Patent Number: 6,037,074
[45] Date of Patent: Mar. 14, 2000

[54] FLEXIBLE GRAPHITE COMPOSITE FOR USE IN THE FORM OF A FUEL CELL FLOW FIELD PLATE

[75] Inventors: Robert Angelo Mercuri, Seven Hills; Jeffrey John Gough, Olmstead Township, both of Ohio

[73] Assignee: UCAR Carbon Technology Corporation

[21] Appl. No.: 09/111,139

[22] Filed: Jul. 7, 1998

[51] Int. Cl.[7] .................................................. H01M 8/10
[52] U.S. Cl. ............................... 429/34; 429/30; 429/38; 428/163
[58] Field of Search ................. 429/34, 30, 36, 429/38, 12; 428/408, 163

[56] References Cited

U.S. PATENT DOCUMENTS

| | | | |
|---|---|---|---|
| 3,404,061 | 10/1968 | Shane et al. | 161/125 |
| 4,190,257 | 2/1980 | Schnitzler | 277/102 |
| 4,226,821 | 10/1980 | Ishikawa et al. | 264/134 |
| 4,642,201 | 2/1987 | Vogel | 252/503 |
| 4,678,724 | 7/1987 | McElroy | 429/34 |
| 4,826,181 | 5/1989 | Howard | 277/112 |
| 4,895,713 | 1/1990 | Greinke et al. | 423/448 |
| 4,911,972 | 3/1990 | Mercuri | 429/99 |
| 4,988,583 | 1/1991 | Watkins et al. | 429/30 |
| 5,108,849 | 4/1992 | Watkins et al. | 429/30 |
| 5,176,863 | 1/1993 | Howard | 264/113 |
| 5,225,262 | 7/1993 | Leduc | 428/75 |
| 5,225,379 | 7/1993 | Howard | 501/99 |
| 5,228,701 | 7/1993 | Greinke et al. | 277/102 |
| 5,300,370 | 4/1994 | Washington et al. | 429/34 |
| 5,494,506 | 2/1996 | Ford et al. | 55/502 |
| 5,527,363 | 6/1996 | Wilkinson et al. | 29/623.1 |
| 5,531,454 | 7/1996 | Borneby | 277/26 |
| 5,683,778 | 11/1997 | Crosier | 428/59 |
| 5,885,728 | 3/1999 | Mercuri et al. | 429/30 |

FOREIGN PATENT DOCUMENTS

| | | |
|---|---|---|
| 54-088911 | 7/1979 | Japan . |
| 63-157747 | 6/1988 | Japan . |
| 63-242395 | 10/1988 | Japan . |
| 1-123991 | 5/1989 | Japan . |
| 8-143856 | 6/1996 | Japan . |
| 8-169478 | 7/1996 | Japan . |

Primary Examiner—Stephen Kalafut
Assistant Examiner—Raymond Alejandro
Attorney, Agent, or Firm—Frederick J. McCarthy

[57] ABSTRACT

Flexible graphite sheet having embedded ceramic fibers extending from its surfaces into the sheet to increase the permeability of the sheet to resin which is grooved by mechanical deformation into a shape useful as a flow field plate in fuel cells, having a thin sheet of flexible graphite affixed to the grooved sheet to provide support therefor.

1 Claim, 12 Drawing Sheets

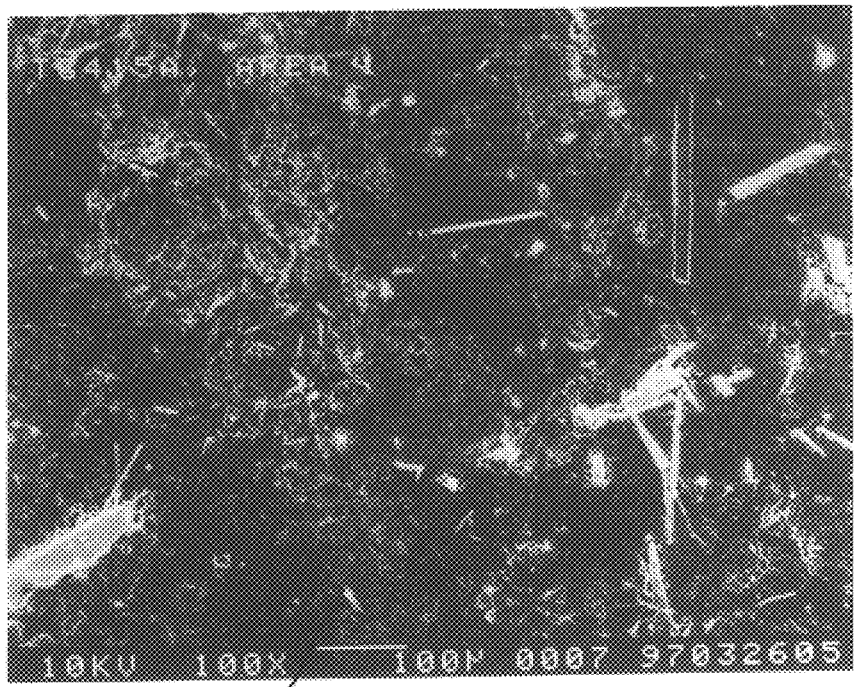
100 Fig. 4
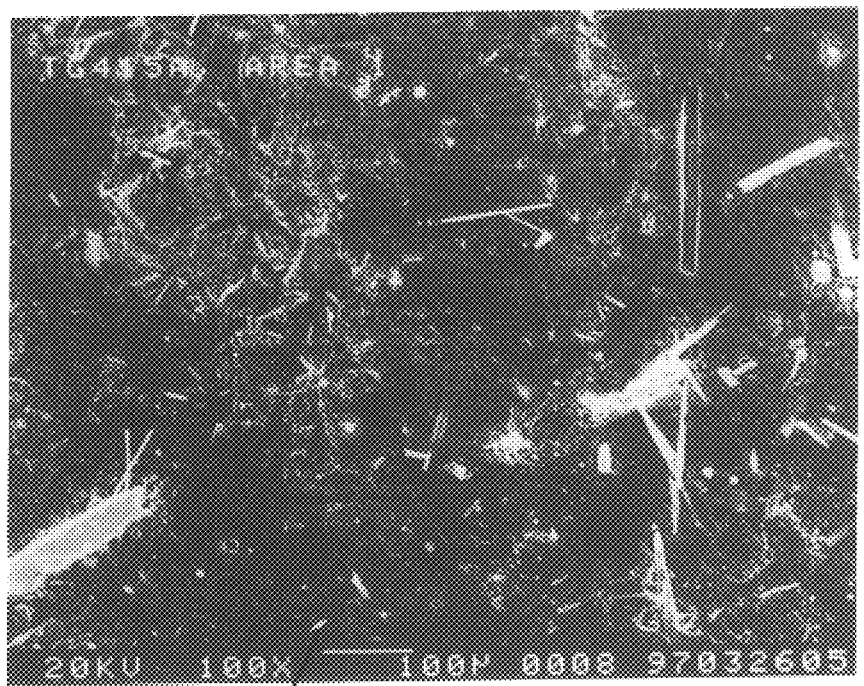
100 Fig. 5

FLEXIBLE GRAPHITE COMPOSITE FOR USE IN THE FORM OF A FUEL CELL FLOW FIELD PLATE

FIELD OF THE INVENTION

The present invention relates to a composite of flexible graphite and needle-shaped ceramic particles in the form of a flow field plate for use in fuel cells.

BACKGROUND OF THE INVENTION

The term "flexible graphite" as used herein represents the exfoliated reaction product of rapidly heated natural graphite particles which have been treated with an agent that intercalates into the crystal-structure of the graphite to expand the intercalated particles at least 80 or more times in the direction perpendicular to the carbon layers in the crystal structure. Flexible graphite and the making thereof is described in U.S. Pat. No. 3,404,061 Shane et al. Expanded, i.e. exfoliated graphite may be compressed into thin sheets (hereinafter referred as flexible graphite "foil") with a density approaching theoretical density, although a density of about 10 to 85 lbs./ft.$^3$ is suitable for most applications, including compression into shapes suitable as seal rings in engine exhaust and other applications.

A common method for making expandable graphite particles, described by Shane et al in U.S. Pat. No. 3,404,061 the disclosure of which is incorporated herein by reference. In the typical practice of this method, natural graphite flakes are intercalated by dispersing the flakes in a solution containing an oxidizing agent e.g., a mixture of nitric and sulfuric acid. The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. A preferred intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solutions may contain metal halides such as ferric chloride, and ferric chloride mixed with sulfuric acid, or a halide, such as bromine as a solution of bromine and sulfuric acid or bromine in an organic solvent. After the flakes are intercalated excess solution is drained from the flakes and after washing with water, the intercalated graphite flakes are dried and are expandable upon exposure to a flame for only a few seconds. The thus treated particles of graphite are hereafter referred to as "particles of intercalated graphite". Upon exposure to high temperature, the particles of intercalated graphite expand in dimension as much as 80 to 1000 or more times its original volume in an accordion-like fashion in the c-direction, i.e. in the direction perpendicular to the crystalline planes of the constituent graphite particles. The exfoliated graphite particles are vermiform in appearance, and are therefore commonly referred to as worms. The worms may be compressed together into flexible sheets which, unlike the original graphite flakes, can be formed and cut into various shapes.

Flexible graphite foil is coherent, with good handling strength, and flexible graphite foil can be wound into rolls and can also be wrapped around metal fixtures such as mandrels, possesses desirable heat transfer properties and is, accordingly, particularly useful for high temperature applications such as engine exhaust seal ring applications. It has been proposed to increase the sealability of flexible graphite sheet or foil by impregnating the same with resin. However, the surface layers of flexible graphite sheet or foil, due to the alignment of exfoliated graphite particles and the constituent layers of atoms parallel to the surface of the flexible sheet or foil, resist resin impregnation when the sheet or foil is immersed in liquid resin. However, due to the well known anisotropy of flexible graphite, resin will flow readily within the flexible graphite sheet in directions parallel to the opposed parallel planar surfaces of the sheet or foil and the planes of the constituent graphite particles of the sheet, i.e. transverse to the "c axis" direction of the graphite particles if penetration into the flexible graphite sheet can first be achieved.

BRIEF DESCRIPTION OF THE DRAWING

FIGS. 2 through 6 are electron microscope views (original magnification 100X) at increasing electron beam intensity voltages (2.5 KV to 40 KV) of a portion of a planar surface of a flexible graphite sheet containing ceramic fibers in accordance with the present invention;

SUMMARY OF THE INVENTION

Figure 1:
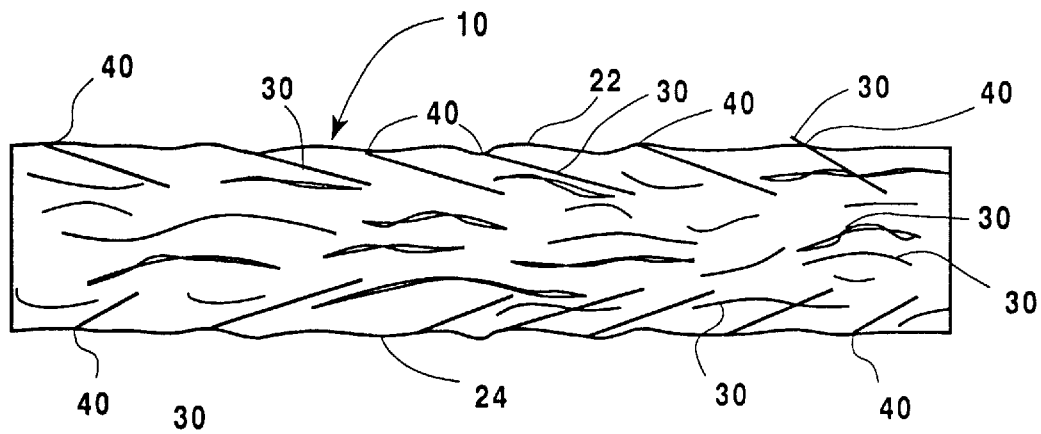
FIG. 1 shows, in an enlarged cross-section sketch of a sheet of flexible graphite (original thickness of 0.01 inch) containing ceramic fibers in accordance with the present invention.

The present invention relates to a combination of a thin flexible graphite sheet affixed to and supporting a composite of resin containing sheet of flexible graphite and needle-shaped ceramic fiber particles which is mechanically deformed to have grooves to form a flow field plate for electrochemical fuel cells.

DETAILED DESCRIPTION

In the practice of a particular embodiment of the present invention, intercalated natural graphite flakes are mixed and blended with from about 1.5 to 30% by weight of needle-shaped ceramic fiber particles having a length of 0.15 to 1.5 millimeters. The width of the particles should be from 0.04 to 0.004 mm. The ceramic fiber particles are non-reactive and non-adhering to graphite and are stable at temperatures up to 2000° F., preferably 2500° F. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

The mixture of intercalated natural graphite flake and needle-shaped ceramic fiber particles, in which the graphite flake and ceramic fiber particles are in general alignment, is exposed to a flame at a temperature up to 2500° F. to exfoliate, i.e. expand the intercalated graphite flake into expanded graphite particles from 80 to 1000 times the volume of the unexpanded intercalated natural graphite flake which surround and entrap the needle-shaped ceramic fiber particles. Due to the expansion, the ceramic fiber particles are no longer in substantial alignment with the graphite particles but are randomly positioned in the mixture of exfoliated graphite and ceramic fiber. The mixture of exfoliated graphite particles and randomly oriented needle-shaped ceramic fiber particles is roll-pressed into sheet or foil typically 0.1 to 3.5 mm thick. The resultant sheet, or foil, is characterized by having needle-shaped particles extending from interior of the flexible graphite sheet to and through at least one of the opposed planar surfaces of the flexible graphite sheet. Since the needle-shaped ceramic fiber particles are non-reactive and non-adhering to the graphite in the flexible sheet, a plurality of annular channels surrounding the respective needle-shaped particles is provided in the flexible graphite sheet extending from the opposed surfaces of the sheet into the body of the sheet. These channels, with the flexible graphite sheet immersed in liquid resin, receive the resin which then infiltrates the flexible graphite sheet in the more permeable direction parallel to the planar surfaces of the flexible graphite sheet and the pressed, exfoliated graphite particles forming the sheet, assisted by channels formed by needle shaped ceramic fiber particles embedded between, but not penetrating the planar parallel surfaces of the flexible graphite sheet. The ceramic fiber particles remain stable during all steps of the processing treatment so that the channels are not blocked by melted fiber or fiber decomposition products. After curing of the resin within the graphite sheet the sealability of the flexible graphite sheet is enhanced for gaskets formed from said sheet. In a preferred embodiment the resin-containing sheet is calendered by roll pressing between pressure rolls.

FIG. 1 is a drawing sketch based on microscope observations of 0.01 inch thick sheets of flexible graphite which shows a flexible graphite sheet 10, in cross-section, with parallel opposed planar surfaces 22, 24. Embedded ceramic fiber particles are shown at 30. Penetration of sheet 10 by ceramic fibers 30 is illustrated at 40.

EXAMPLE I

Natural graphite flake, sized 80% by weight held on 50 mesh was treated in a mixture of 90 wt. % sulfuric acid and 10 wt. % nitric acid. The thus treated intercalated graphite flake was water washed and dried to about 1% by weight water. One (1) pound of this intercalated flake was mixed with 0.15 pounds of needle-shaped ceramic fiber of commercially available calcium metasilicate sized mostly with a 15 to 25 (l/w) aspect ratio. The mixture of intercalated graphite and calcium metasilicate fiber was introduced into a furnace of 2500° F. to obtain rapid expansion of the intercalated graphite flake into vermicular worm-shaped particles having a volume of about 325 times that of the unexpanded intercalated flake. The expanded worm-shaped particles surrounded the admixed calcium metasilicate fibers and the mixture was rolled into a flexible graphite sheet 0.01 inch thick and 24 inches wide in which admixed calcium metasilicate fibers extended from a surface of the sheet into the body of the sheet which contained about 12% by weight of the calcium metasilicate fiber.

Figure 2:
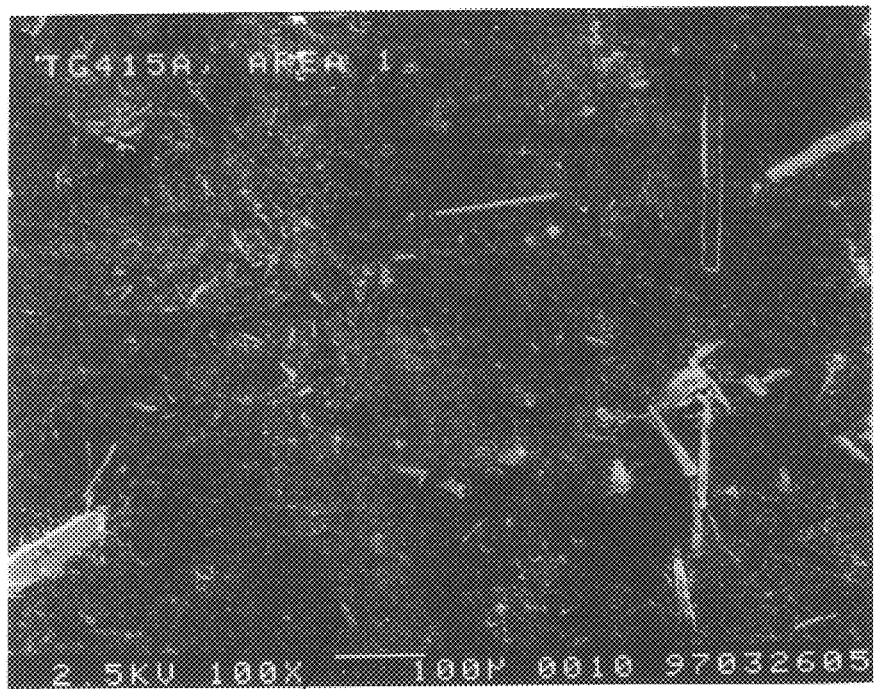
Figure 3:
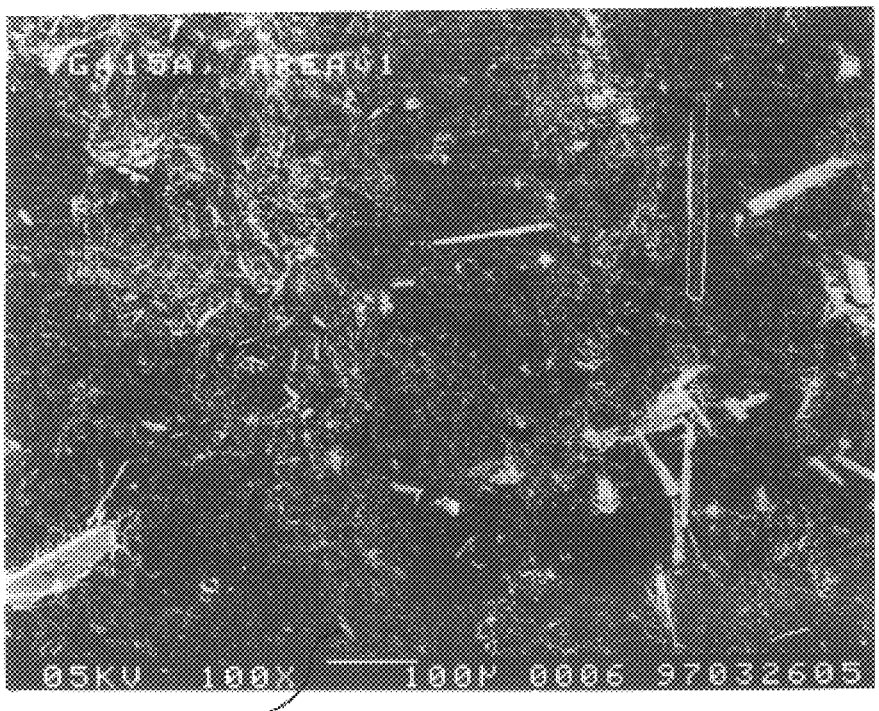
Figure 6:
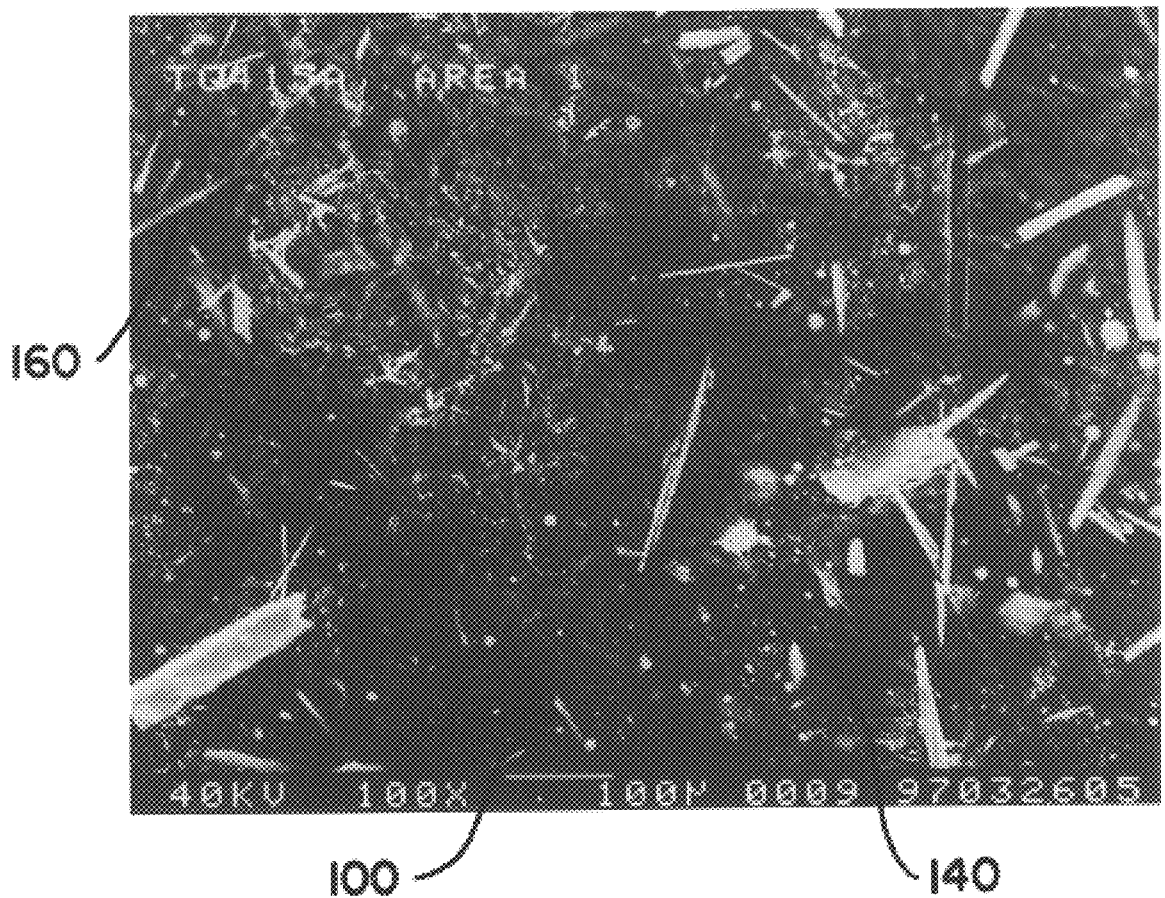

The electron microscope view of FIG. 2 (100X- see 100 micron scale) shows the upper portion of a ceramic fiber 100 which penetrates a planar surface 22 of a flexible graphite sheet. FIGS. 3 to 6, at increasing voltages, look "deeper" into the flexible graphite sheet and show the penetration of ceramic fiber 100 into the flexible graphite sheet. Ceramic fibers embedded in the flexible graphite sheet below surface 72 are shown at 140, 160.

EXAMPLE II

A sample of the sheet of Example I, 8 inches wide was immersed in and pulled through a solution 10% phenolic resin with acetone diluent at a rate of 10 feet per minute. After immersion and drying, the sample showed an increase in weight of 18.7%.

The sample was further treated by heating to 235° C. to cure and stabilize the resin and the sheet was calendered between pressure rolls to a density of 1.5 gms/cc. The calendered sheet was soaked in oil and water and was unaffected, i.e. impervious. A control sheet without any added ceramic fiber or resin additives exposed to the same test conditions increased about 35% in weight and 8% in thickness.

Sample sheets with 5%, 15% and 25% by weight of calcium metasilicate fibers as additive were pulled through the resin solution at a rate of 10 feet per minute and were saturated with resin at about 17–19% by weight of resin. A control sample without any added ceramic fiber retained only 5% by weight of resin at the same pull rate of 10 feet per minute.

EXAMPLE III

Figure 7:
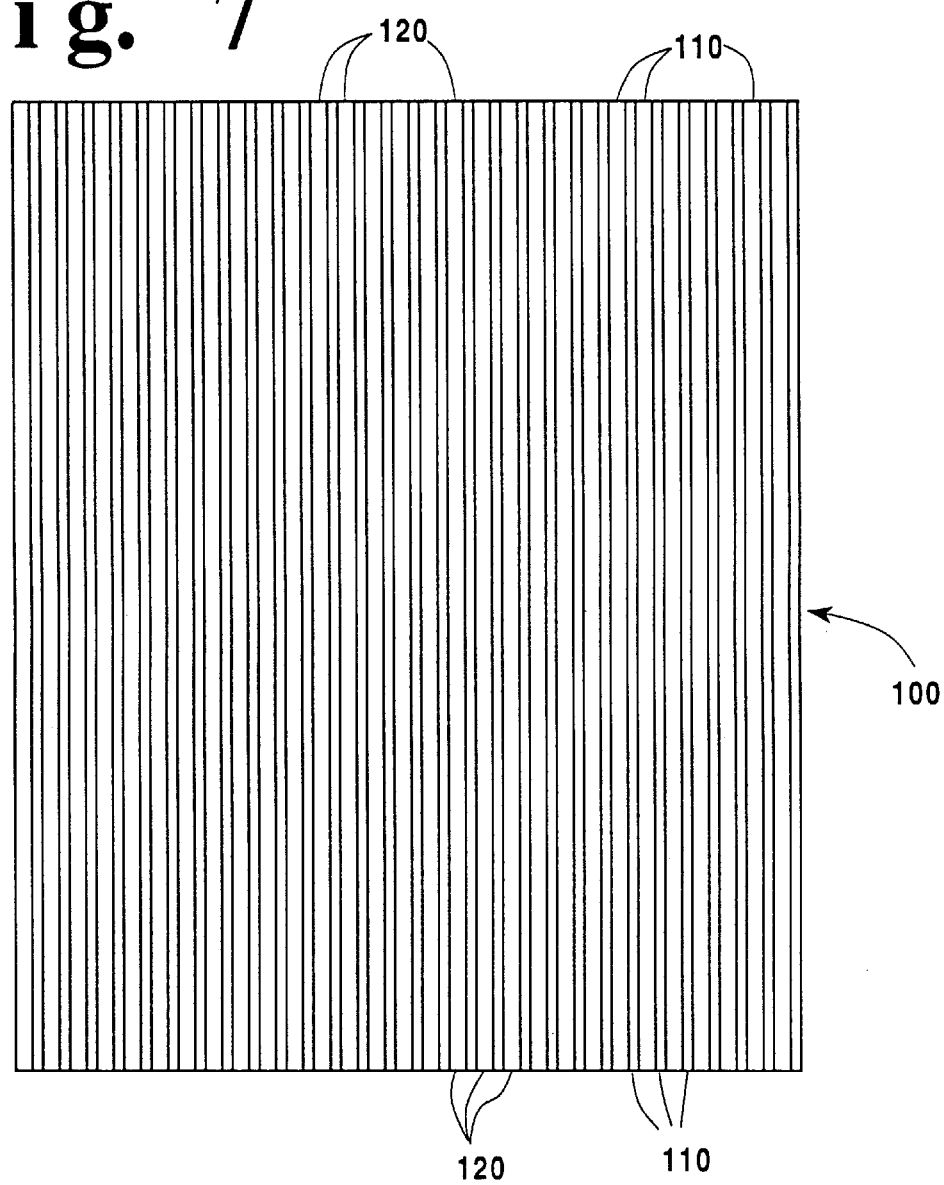
FIG. 7, 7A show a portion of a sheet of flexible graphite containing ceramic fibers in accordance with the present invention which has been mechanically deformed into a grooved plate for use as a flow field plate in a Fuel Cell.
Figure 7A:
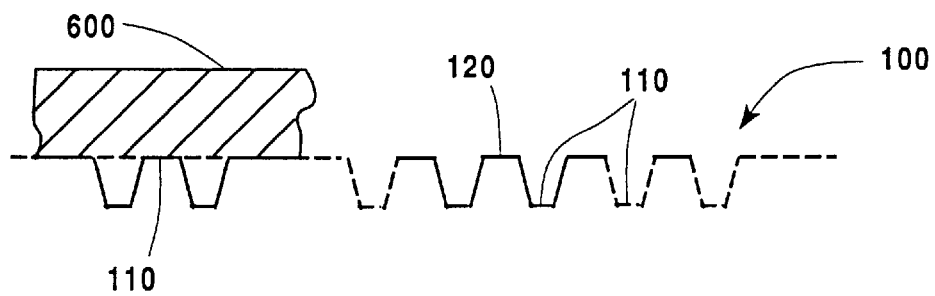

Calendered flexible graphite sheet material of the type described in Example I containing 5% by weight of calcium metasilicate fibers (100 mm×100 mm) was mechanically deformed by stamping into a shape as shown in the top and side views of FIGS. 7, 7A, which shape is useful as a fluid flow plate for a fuel cell. The plate 100 has multiple grooves separated by walls 120. The grooves 110 are typically 1.5 mm deep and 1–1.5 mm wide and extend to cover the electrode of the fuel cell. The walls 120 are typically 1–1.5 mm inch thick. The density before mechanical deformation is approximately 0.1 to 0.3 gm/cc and after stamping is typically exceeds 1.1 g/cc. The plate 100 of FIGS. 7, 7A is subjected to impregnation using the resin of Example II under pressure of about 15 psi to provide about 20% by weight of resin in the plate after being cured by heating to 235° C. The resin impregnated plate, as compared to prior art graphite plates with milled grooves, has increased flexural strength, improved heat dispersion and lower voltage drop across its thickness when in use as a fluid flow field plate in a fuel cell.

EXAMPLE IV

A one square foot sample of sheet containing 5% by weight fiber of the type described in Example I was immersed in the diluted resin solution of Example I for a period of 15 seconds such that the sheet contained a uniform distribution of 15% by weight resin. The sheet was dried to a tack free condition (~100° C.) and was mechanically deformed by stamping into a shape as shown in the top and side views of FIGS. 7, 7A, which shape is useful as a fluid flow plate for a fuel cell. The plate 100 has multiple grooves separated by walls 120. The grooves 110 are typically 1.5 mm deep and 1–1.5 mm wide and extend to cover the electrode of the fuel cell. the walls 120 are typically 1–1.5 mm inch thick. The density before mechanical deformation is approximately 0.1 to 0.3 gm/cc and after stamping is typically exceeds 1.1 g/cc. The plate 100 of FIGS. 7, 7A was then heated slowly to 235° C. to achieve the property improvements of Example III.

Figure 10:
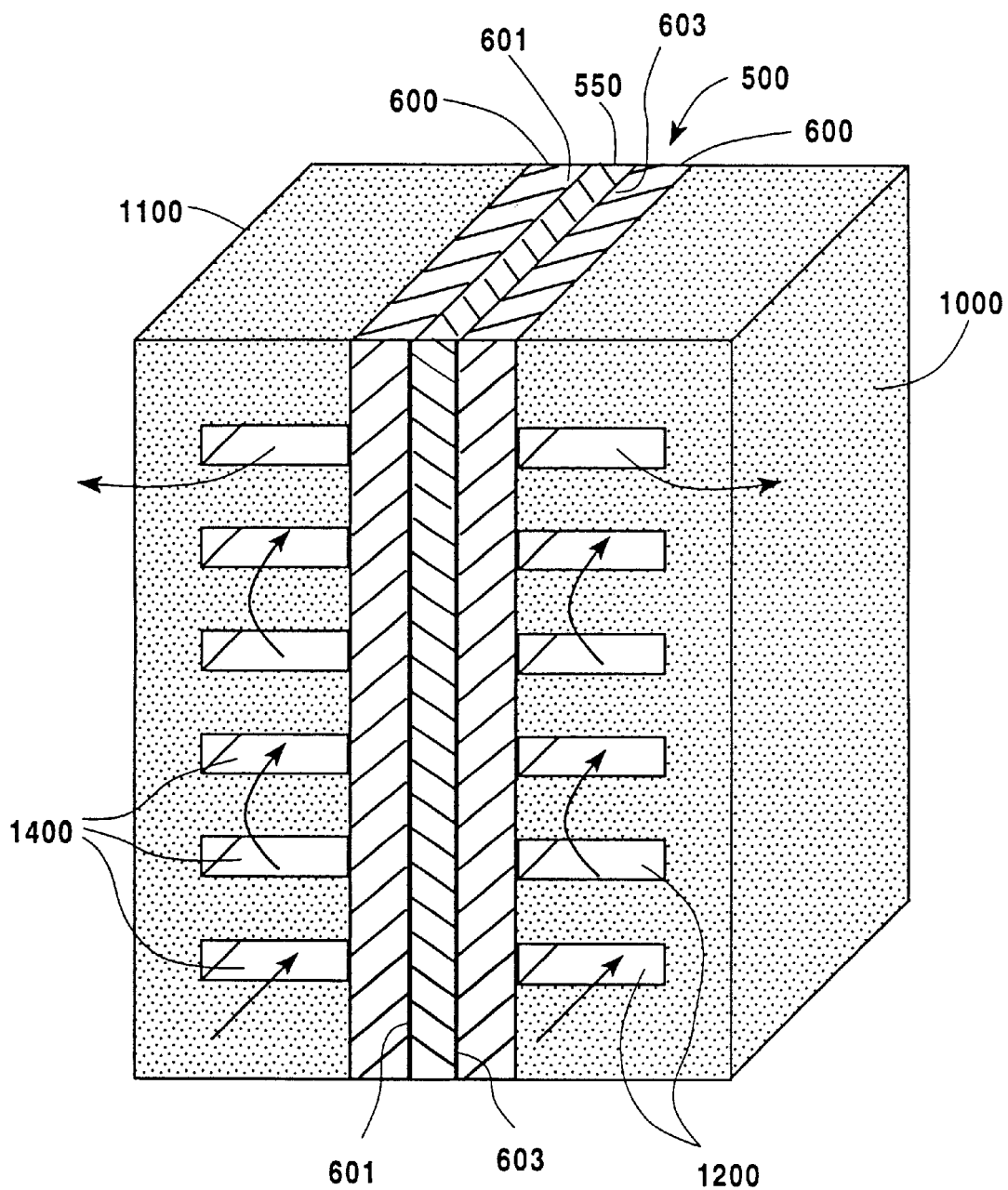
FIG. 10 shows, schematically, a prior art electrochemical fuel cell.

FIG. 10 shows, schematically, the basic elements of a Fuel Cell, more complete details of which are disclosed in U.S. Pat. Nos. 4,988,583 and 5,300,370 and PCT WO 95/16287 (Jun. 15, 1995).

With reference to FIG. 10, the Fuel Cell indicated generally at 500 comprises electrolyte in the form of a plastic e.g. solid polymer membrane electrolyte 550. Carbon fiber electrodes 600 coated at the electrode-membrane interfaces 601, 603 with a catalyst 600, e.g. platinum. Flow field plates 1000, 1100 abut the catalyst layers 600 and fuel, e.g. hydrogen gas, is circulated through grooves 1400 of oxidant flow field plate 1100. In operation, the fuel flow field plate 1000 becomes an anode, and the oxidant flow field plate 1100 becomes a cathode with the result that an electric potential, i.e. voltage is developed between the fuel flow field plate 1000 and the oxidant flow field plate 1100. The above described electrochemical fuel cell is combined with others in a fuel cell stack to provide the desired level of electric power as described in the above-noted U.S. Pat. No. 5,300,370.

Figure 8A:
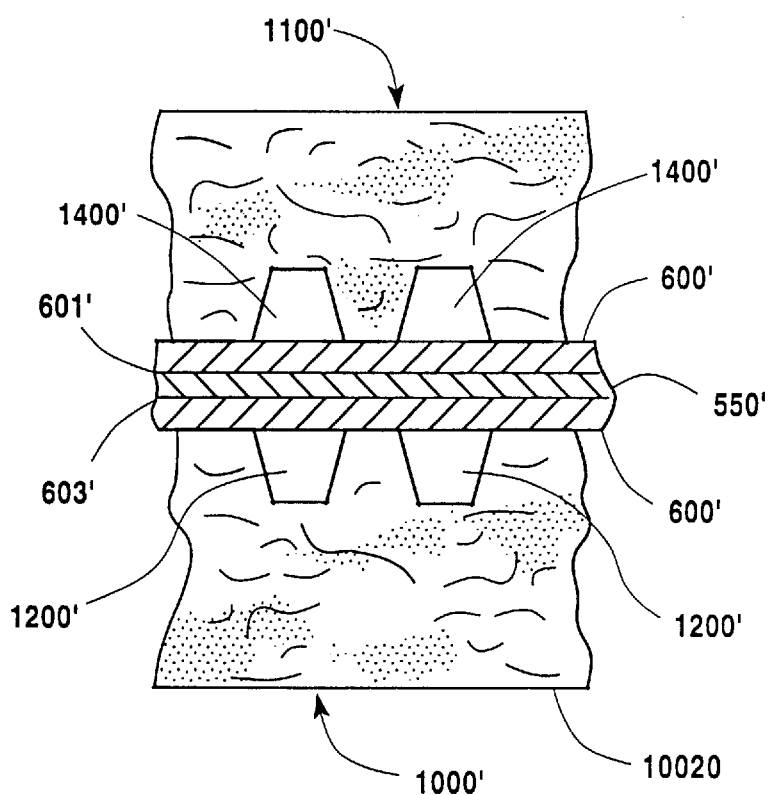
FIGS. 8, 8A show a top and partial side elevation view (in section) of flow field plates of this invention as components of a fuel cell
Figure 8:
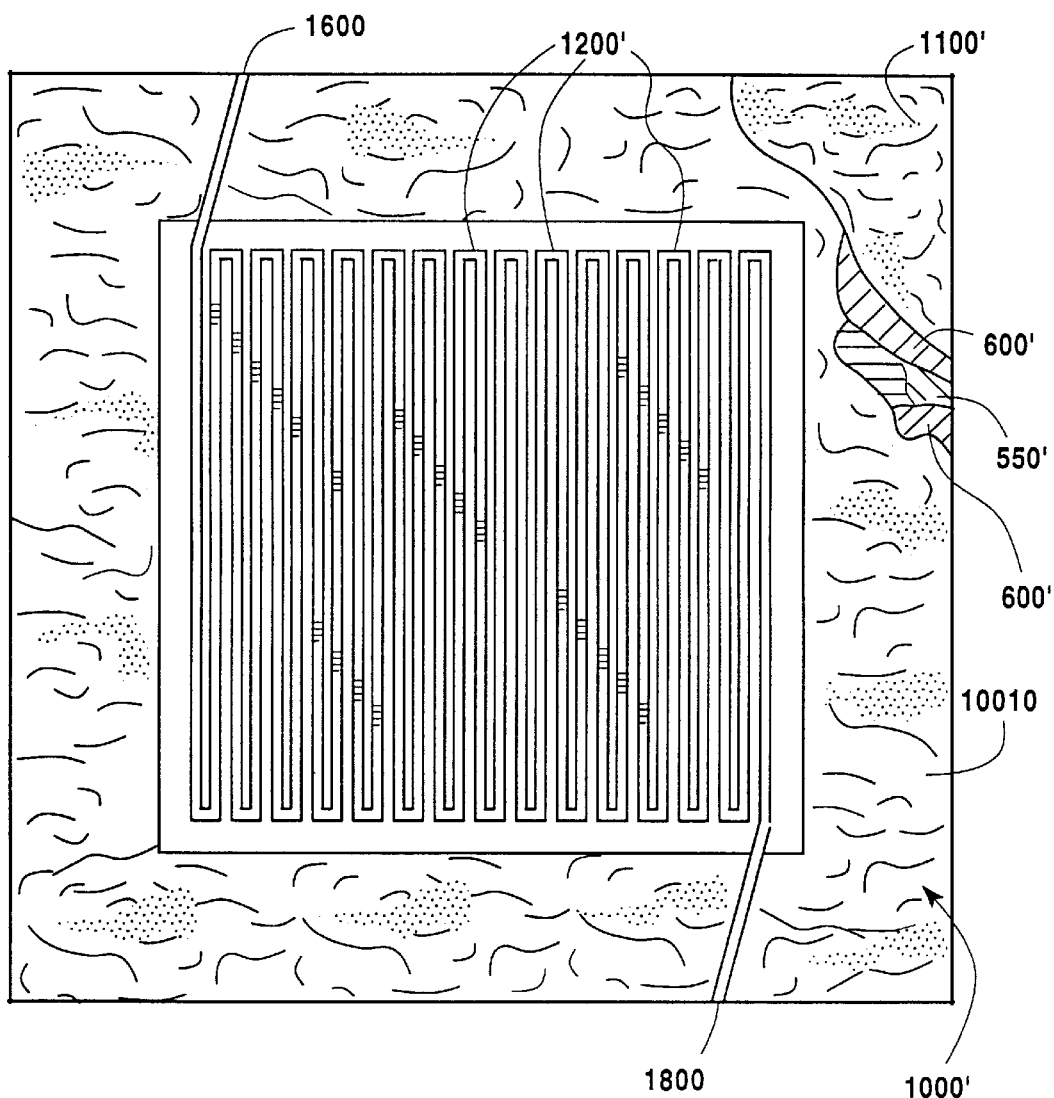

A fluid flow field plate 1000' having a continuous reactant flow channel, of the type described in Watkins U.S. Pat. No. 4,988,583, is shown in FIG. 8 and FIG. 8A. The plate is resin containing flexible graphite sheet which contains 12% by weight calcium metasilicate fibers of the type described in Example III. A planar surface 10010 of plate 1000' has formed therein by stamping or molding, a single continuous fluid flow channel 1200' which has a fluid inlet 1600 and a fluid outlet 1800. The opposite planar surface 10020 is undeformed. Fluid inlet 1600 is connected to a source of fuel (not shown) in the case of the anode flow field plate, or a source of oxidant (not shown) for the cathode flow field plate. Channel 1200' traverses in a plurality of passes a major central area of plate 1000', which corresponds to the electrocatalytically active region of the anode or cathode to which it is adjacent when assembled as shown in FIG. 8A. When assembled in fuel cell stack, each flow field plate also functions as a current collector.

Figure 9:
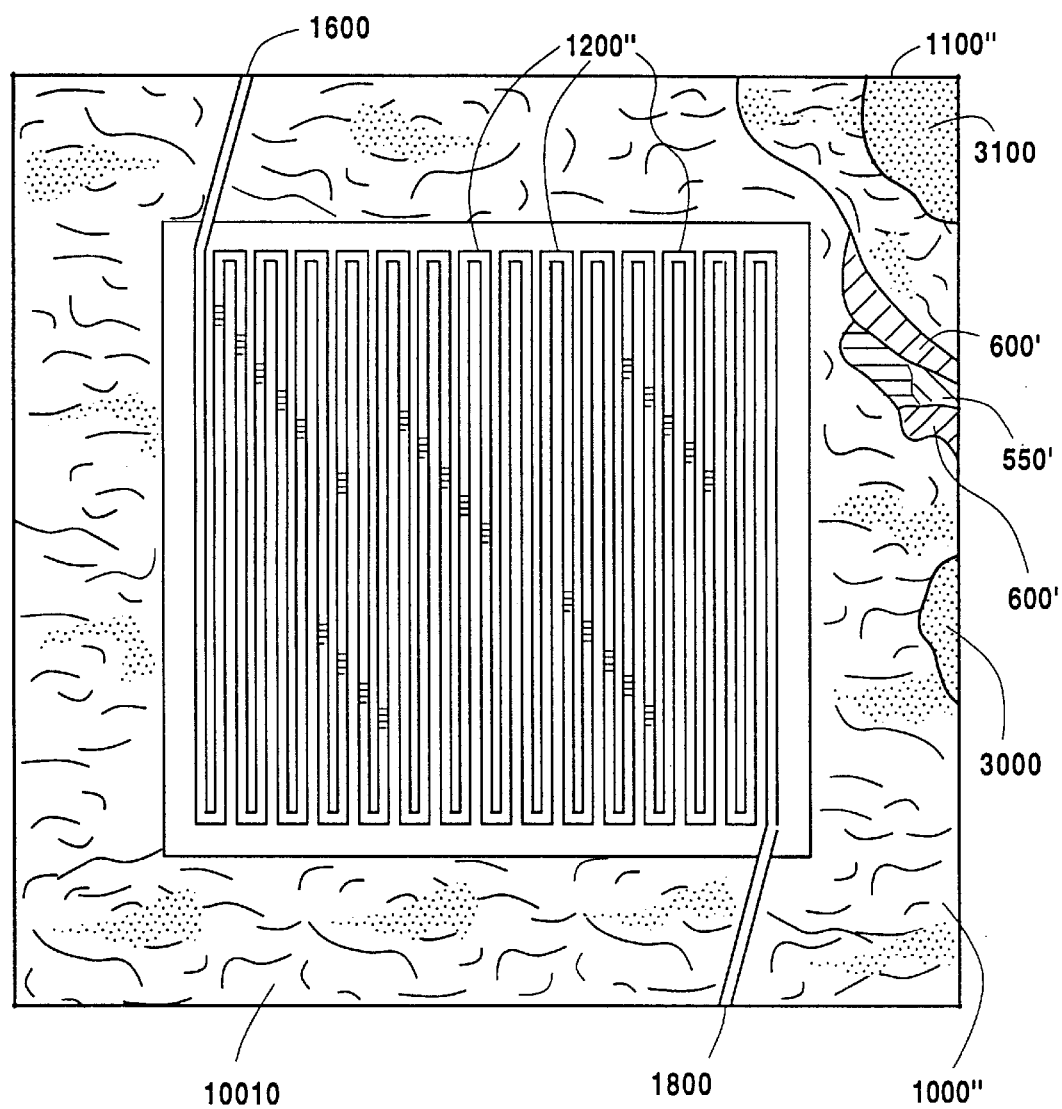
FIGS. 9, 9A and 9B show a top and partial side elevation view (in section) and a partial perspective view of flow field plates of this invention as components of a fuel cell.
Figure 9A:
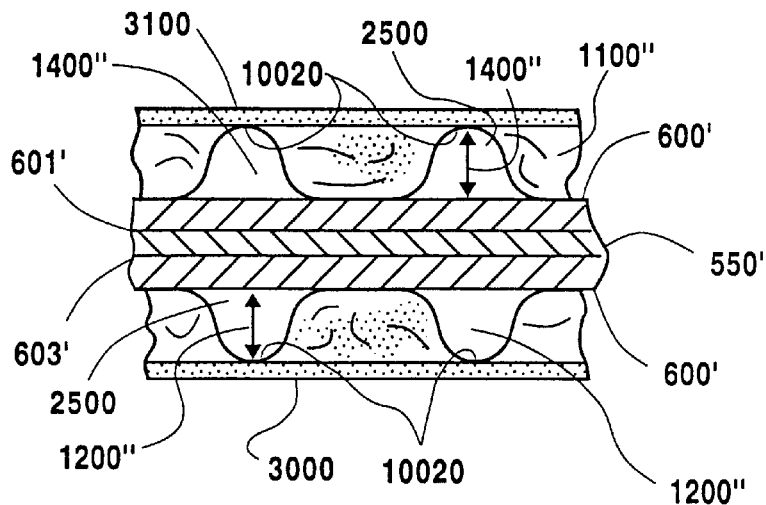
Figure 9B:
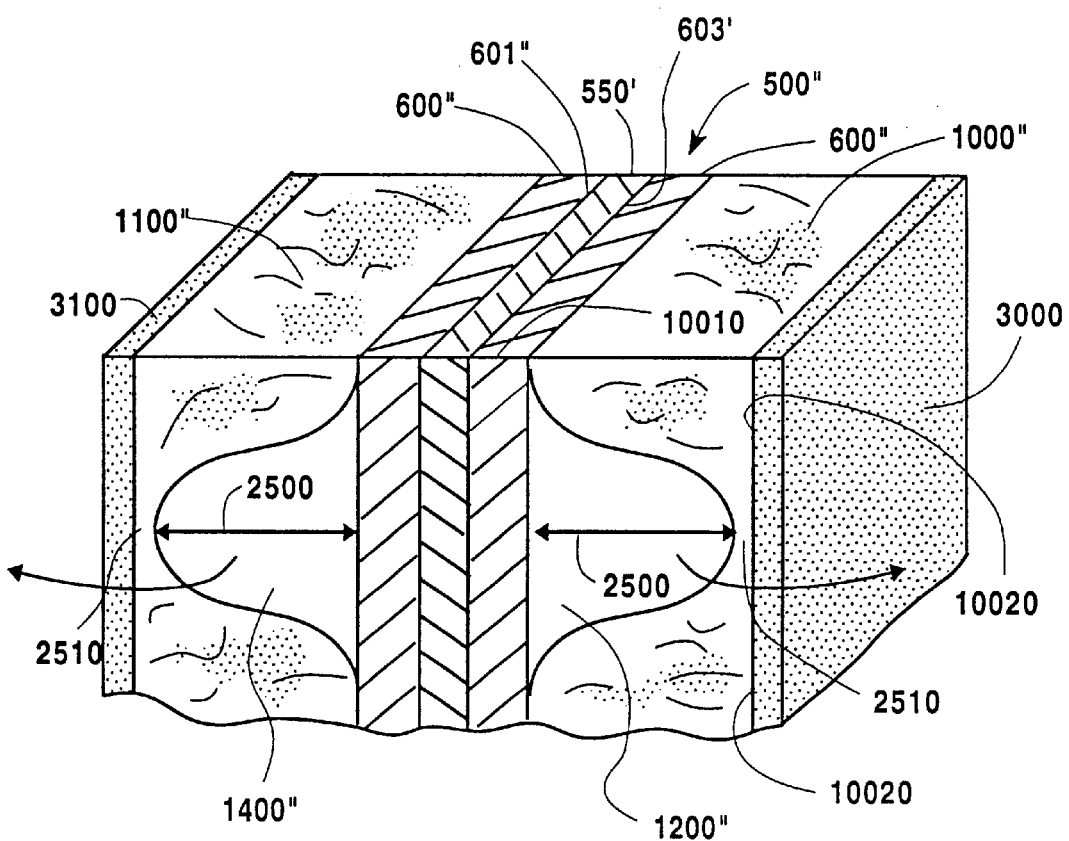

In a preferred embodiment of the present invention, illustrated in FIGS. 9, 9A, a fluid flow field plate 1000" is shown having a continuous reactant flow channel of the type shown in FIG. 8 and FIG. 8A. The plate is a resin containing flexible graphite sheet of the type described in Example III which can contain from 1.5 to 30% by weight of ceramic fibers, preferably 1.5 to 5% by weight. A surface 10010 of plate 1000" has formed therein by mechanical deformation, e.g. by stamping or molding, or by the use of an embossed calendar roll, a single continuous fluid flow channel 1200" which has a fluid inlet 1600 and a fluid outlet 1800. The opposite planar surface 10020 is undeformed. Fluid inlet 1600 is connected to a source of fuel (not shown) in the case of the anode flow field plate, or a source of oxidant (not shown) for the cathode flow field plate. Channel 1200" traverses in a plurality of passes a major central area of plate 1000', which corresponds to the electrocatalytically active region of the anode or cathode to which it is adjacent when assembled as shown in FIG. 9A. When assembled in fuel cell stack, each flow field plate also functions as a current collector. FIG. 9B shows a partial view of a fuel cell 500" utilizing flow field plates 1000", 1100" in accordance with the present invention.

Channel 1200" (and 1400") is formed so that the depth of the channel, indicated at 2500 in FIG. 9A extends to within 0.2 mm, suitably less than 0.1 mm, or less, of the undeformed planar outer surface 10020 of plate 1000" (and also 1100") which is opposite the grooved planar outer surface 10010 of plate 1000" (and also plate 1100"). By so configuring channels 1200", 1400", the total mass of graphite required for the fuel cell is substantially reduced and thus the volumetric efficiency of the fuel cell is substantially increased. However, by minimizing the thickness of the base 2510 adjacent undeformed planar, outer surface 10020 of channel 1200", due to the increased depth of channels 1200", 1400", i.e. to 0.2 mm or less from the undeformed planar surface 10020, the plate 1000" lacks rigidity and the very thin base 2510 could exhibit permeability to the gases utilized in a fuel cell. To overcome this disadvantage, while maintaining increased volumetric efficiency, a relatively thin (0.07 mm to 0.15 mm) sheet of high density (1 to 1.5 grams per cubic centimeter) roll pressed flexible graphite sheet 3000 is fixed to the surface 10020 of plate 1000". The thin, high density flexible graphite sheet 3000 provides rigidity for plate 1000" and due to the impermeability to gases of roll pressed flexible graphite sheet in the direction transverse to its thickness, the base 2510 of channel 1200" and surface 10020 of plate 1000" are made virtually gas-tight. Since the roll pressed flexible graphite sheet 3000 exhibits high electrical conductivity in the transverse direction, the electrical efficiency of plate 1000" as a fuel cell component is not impaired.

A preferred procedure for making the aforedescribed fluid flow field plate in accordance with the present invention illustrated schematically in FIG. 11A–E.

Figure 11:
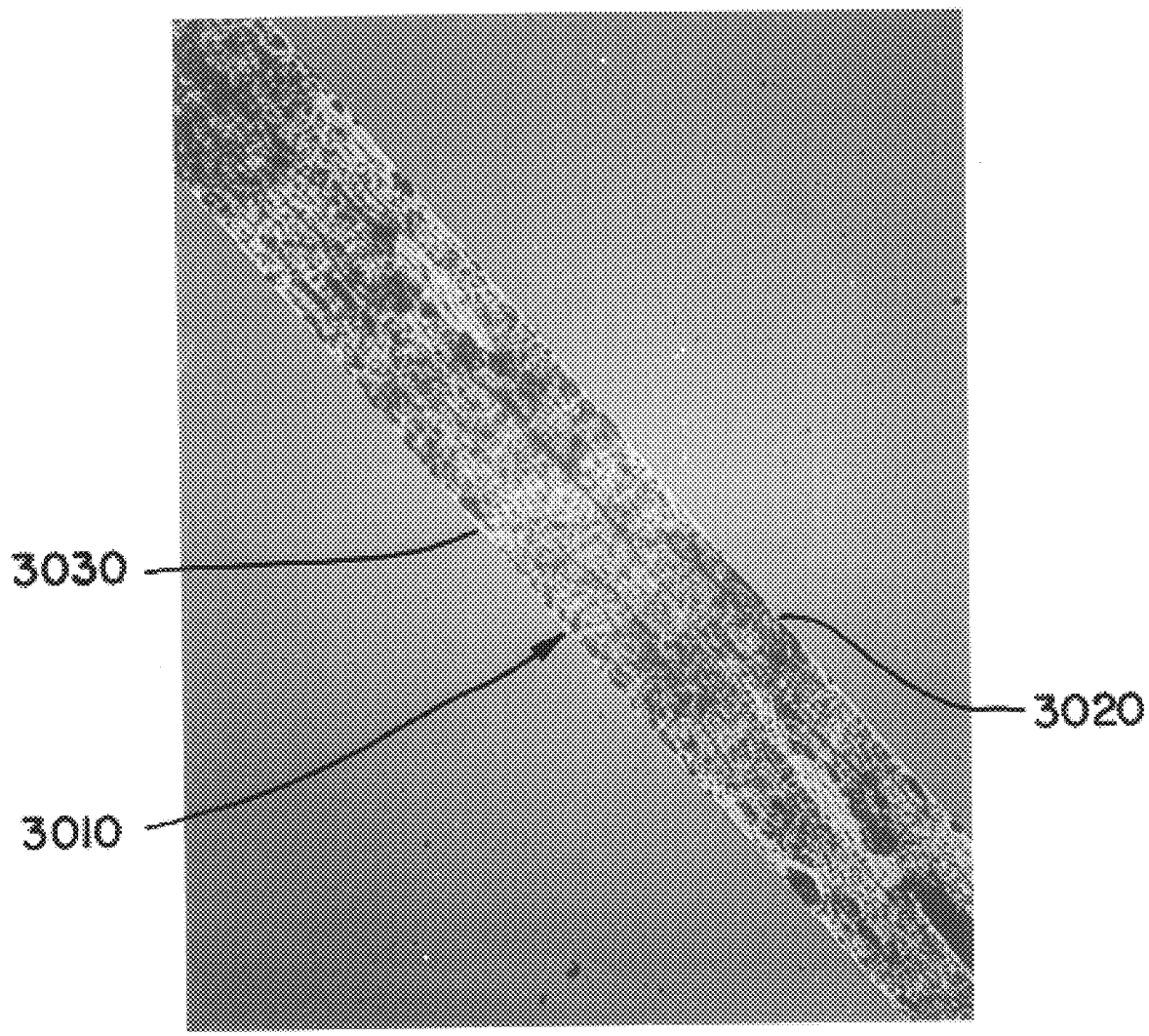
FIGS. 11A–E illustrate the making of a flow field plate in accordance with the present invention.
Figure 11A:
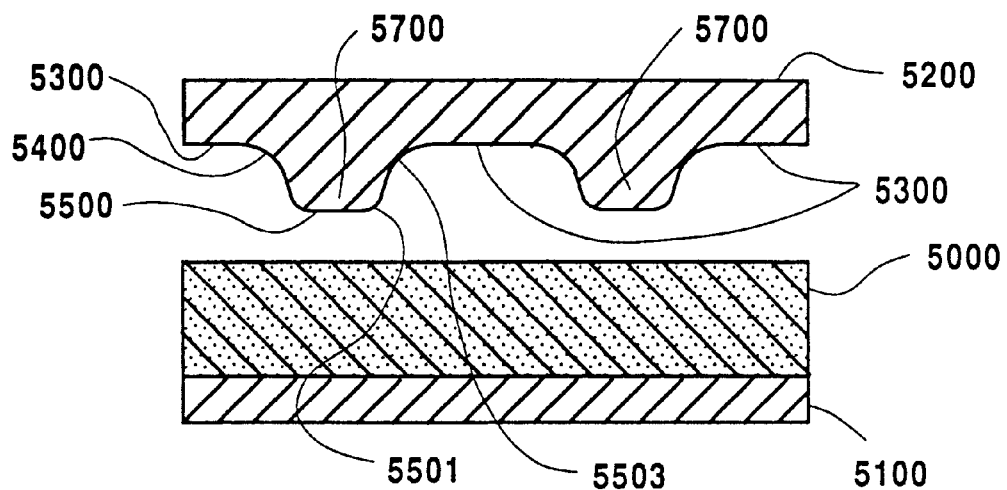

With reference to FIG. 11A, a sheet of flexible graphite of low density, e.g. 0.1 g/cc to 0.3 g/cc, is shown at 5000. Sheet 5000 is suitably formed by roll pressing or platen pressing exfoliated graphite particles.

Figure 11B:
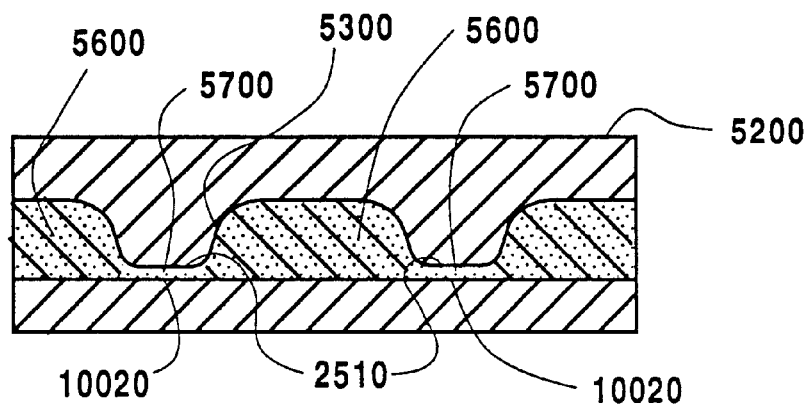

The low density sheet of flexible graphite 5000 is supported by steel plate 5100 and metal die mold 5200 is positioned above flexible graphite sheet 5000. The mold cavity 5300 is continuous in order to provide channels 1200" (1400") and the mold cavity corners 5400, 5500 are rounded as shown at 5501, 5503 so that upon bringing the die mold 5200 and plate 5100 into contact, as shown in FIG. 11B, the low density graphite sheet 5000 is compressed and deformed to achieve a density increase of at least four times, e.g. to 1.1 to 2 g/cc with the compressed flexible graphite sheet 5600 uniformly filling the mold cavities 5300. The die elements 5700 are dimensioned so that the base portions 2510 of the compressed and deformed flexible graphite sheet 5600 are very thin e.g. 0.05 to 0.2 mm thick.

Figure 11C:
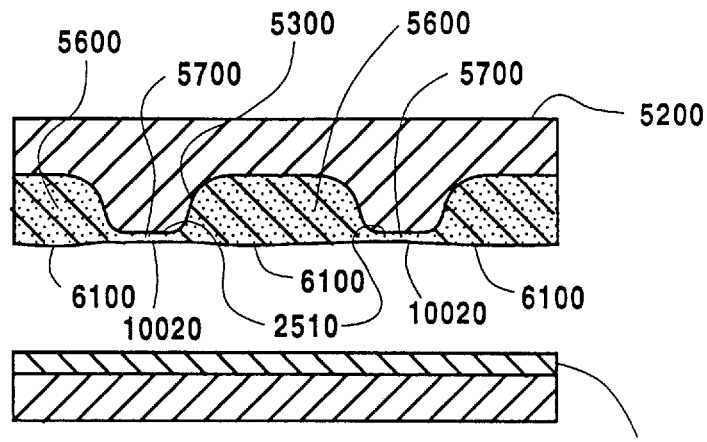
Figure 11D:
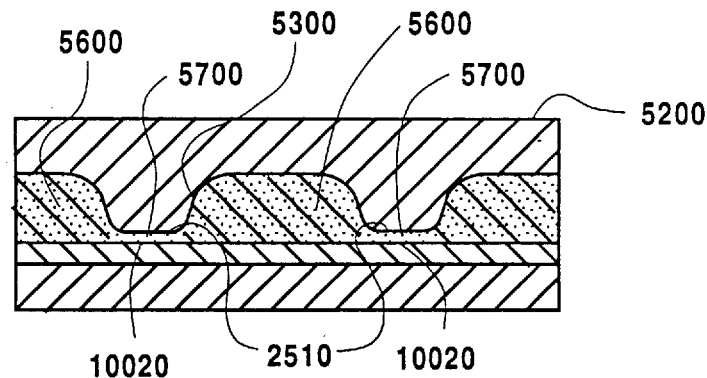
Figure 11E:
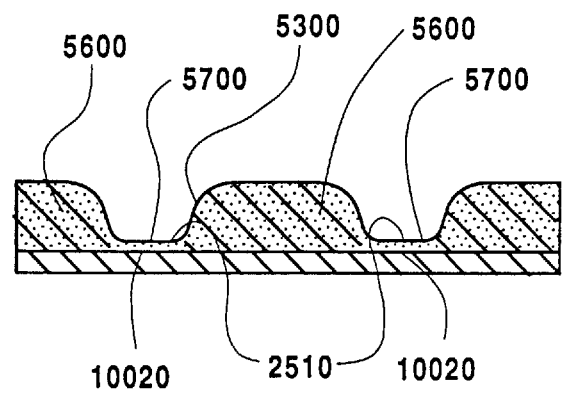

After compression and deformation of flexible graphite sheet 5600, the die mold 5200 is separated from the steel plate 5100 as shown in FIG. 11C and a thin roll pressed, gas impermeable (0.07 to 0.15 mm) sheet of high density (1.0 to 1.5 gms per cc) flexible graphite 6000 is placed on steel plate 5100. The compressed flexible graphite sheet 5600 remains in die mold 5200 due to slight expansion of the compressed flexible graphite which also results in a slight "spring back" protrusion indicated at 6100. The die mold 5200, which contained compressed flexible graphite sheet 5600 is brought into contact with thin flexible graphite sheet 6000, as shown in FIG. 11D, and affixed to flexible graphite sheet 6000. This can be accomplished by pressing die mold 5200 against sheet 6000 so that, the resin containing sheet 5600 and sheet 6000 which may also contain resin, are bonded upon curing of the resin. The sheets 5600, 6000 can also be bonded by adhesive previously applied at the contacting surfaces and subsequently cured.

What is claimed is:

1. A fluid flow field plate for use in a fuel cell comprising: (i) a resin impregnated flexible graphite sheet having opposite planar outer surfaces, said flexible graphite sheet having embedded therein a dispersion of a plurality of needle-shaped ceramic fiber particles which are non-reactive with flexible graphite and stable at temperatures up to 2500° F., said needle-shaped particles extending into said graphite sheet from at least one of said planar outer surfaces to provide channels for containing said resin, and one of said planar outer surfaces having formed therein a continuous fluid flow channel adapted to receive and exhaust a fluid fuel or oxidant, said fluid flow channel having a depth which extends to within 0.2 mm or less of the opposite planar outer surface, and (ii) a thin sheet flexible graphite sheet affixed to said opposite planar outer surface to provide support for the fluid flow field plate.

* * * * *